(12) United States Patent
Tipper et al.

(10) Patent No.: US 8,442,997 B2
(45) Date of Patent: May 14, 2013

(54) METHOD AND APPARATUS FOR MONITORING THE DISTRIBUTION OF ELECTRONIC FILES

(75) Inventors: Guy Charles Tipper, Kent (GB); Christopher James Wood, West Sussex (GB)

(73) Assignee: Media Mark Technologies Limited (GB)

( * ) Notice: Subject to any disclaimer, the term of this patent is extended or adjusted under 35 U.S.C. 154(b) by 107 days.

(21) Appl. No.: 13/029,428

(22) Filed: Feb. 17, 2011

(65) Prior Publication Data

US 2012/0215811 A1    Aug. 23, 2012

(51) Int. Cl.
*G06F 17/00* (2006.01)

(52) U.S. Cl.
USPC ............ 707/791; 707/802; 707/822; 707/828

(58) Field of Classification Search ........... 707/600–899
See application file for complete search history.

(56) References Cited

U.S. PATENT DOCUMENTS 6,748,533 B1 * 6/2004 Wu et al. ...................... 713/176

* cited by examiner

*Primary Examiner* — Isaac M Woo
(74) *Attorney, Agent, or Firm* — Tran Anh Nguyen; Donald D. Min (57) ABSTRACT

A remote server is arranged to respond to a request from a user terminal for the download of a media file to cause a unique water-marked copy of a media file to be generated and sent to the user terminal. At the same time the remote server is arranged to access a seal server, which causes an electronically sealed record of the transaction to be generated and stored in a download database. Subsequently, if a suspect media file is identified the sealed record provides evidence of the original transaction which led to the water-marked copy of the media file being issued and hence the original source of the unauthorised copy of the file. Control of distributed media files can be enforced by imposing penalties in the event that unauthorised copies corresponding to the distributed water-marked media files are identified.

11 Claims, 3 Drawing Sheets

METHOD AND APPARATUS FOR MONITORING THE DISTRIBUTION OF ELECTRONIC FILES

FIELD

The present invention relates generally to a method and apparatus for monitoring the distribution of electronic files. In particular, embodiments of the present invention relate to a distribution and monitoring system for monitoring the distribution of electronic media files, such as music tracks or video files.

BACKGROUND

These days media content such as music and video data is typically stored in electronic form and distributed electronically. This electronic storage and distribution reduces the costs involved in getting the media content to end-users. However, the move to electronic storage and distribution also facilitates unauthorised sharing and copying and unauthorised copying of music and video files costs the music and film industries significant amounts of money every year in terms of lost revenue.

Content generators have turned to digital rights management in an attempt to reduce the amount of unauthorised copying. Digital rights management (otherwise known as DRM) involves the use of technology to limit or control copying of data files. Typically Digital Rights Management systems control the ability of end users to copy files by encrypting or scrambling some or a portion of a media file. Access to the media file can then be controlled by limiting access to the means for unscrambling or decrypting that portion of the file. Decrypting normally requires an end user to obtain a cryptographic key. Such a key can either be provided directly to a valid end user or alternatively require an end user to access a central database to have their identity validated whenever a copy of a file is to be made.

Digital Rights Management systems suffer from a number of drawbacks. Validation of a user's identity can be cumbersome and intrusive. Although central control of access keys increases security, accessing a central database for validation data can be monitored and logging data about a user's use of specified media files can raise concerns about privacy.

Problems also exist with DRM systems where a user desires to transfer a media file from one location to another. This can require users to revalidate their right to use a particular file, which can be unnecessarily time consuming. If such rights are not revalidated a legitimate user can be prevented from using data that they have acquired and paid for.

Digital watermarks are features of media that are added during production or distribution. More specifically digital watermarks involve marking electronic files with a unique code, typically spread throughout the file so that a copy of file is rendered unique. The addition of data is normally such so as not to degrade the quality of the original. Rather, a number of items of data are slightly modified compared with an original in a manner, which does not change the apparent appearance of sound of an original. Thus for example the colours of individual pixels in image files can be slightly modified which result a pixel being rendered in a different colour where the differences between the original and the modified image are not detectable by the human visual system. Although not apparent in an output image, the water-mark data can, still however, be detected by a direct comparison with an original file to identify which items of data have been modified compared with an original. Digital watermarks can form part of a digital rights management system.

Due to the limitations of conventional Digital Rights Management systems, alternative approaches are required or desirable.

SUMMARY

In accordance with one aspect of the present invention, there is provided a method of recording evidence to establish the origin of an electronic file, comprising: receiving a request to provide a copy of an electronic file from a requester; generating a water-marked copy of the requested electronic file; creating an electronic seal on the basis of data indicative of the generated watermarked copy of the requested electronic file, the requester of the copy of the electronic file and the time of the generation of the electronic seal; storing a copy of the electronic seal; and providing the generated water-marked copy of the requested electronic data to the requester.

Generating a water-marked copy of an electronic file may comprise: obtaining an electronic file; determining a code to be embedded in the electronic file; and modifying portions of the electronic file to embed value corresponding to the determined code wherein the modification of portions of the electronic file are not such so as to effect the functionality of the modified file compared with the obtained electronic file.

In some embodiments, the electronic file may comprise data recording sound and the modification of portions of the electronic file may comprise modifying sound data included in the file in a manner, which is not detectable when listening to the sound. In other embodiments the electronic file may comprise image data and the modification of portions of the electronic file may comprise modifying image data included in the file in a manner, which is not detectable when viewing the image recorded by the image data.

The data indicative of the generated watermarked copy of the requested electronic file may comprise a copy of the generated watermarked copy of the requested electronic file. Alternatively, the data indicative of the generated watermarked copy of the requested electronic file may comprise a hash value determined by processing the generated watermarked copy of the requested electronic file.

Creating an electronic seal on the basis of data indicative of a generated watermarked copy of the requested electronic file, the requester of the copy of the electronic file and the time of the generation of the electronic seal may comprise: obtaining time data indicative of a current time; determining a hash value for an electronic document including data indicative of the generated watermarked copy of the requested electronic file, the requester of the copy of the electronic file and the current time; encrypting the determined hash value for the electronic document; and including the encrypted hash value in the electronic seal.

A generated electronic seal may include human interpretable data selected from the group comprising the name and address of the requester of the electronic file; the name of the electronic file; data identifying the provider of the electronic file and data identifying the provider of the electronic seal.

Recording data as evidence of a request may be included as part of a method of providing an electronic file to a requester. In such a method a requester may be provided with terms and conditions for obtaining a copy of an electronic file, including a term restricting the provision of copies of the electronic file to third parties. The requester may then be provided with a generated copy of a generated watermarked copy of an electronic file in response to input from the requester confirming acceptance of the terms and conditions.

Subsequently, a suspect copy of the electronic file may be identified. Data indicating the origin of the suspect copy can then be determined by comparing data indicative of the suspect electronic file with data indicative of a generated watermarked copy of a requested electronic file for which an electronic seal has been generated. If the comparison indicates that the suspect electronic file corresponds to a generated watermarked copy of a requested electronic file, the origin of the suspect file can be identified by determining the identity of the requester of the generated watermarked copy of a requested electronic file corresponding to the suspect track. In such circumstances a term restricting the provision of copies of the electronic file to third parties can then be enforced against the requester.

In another aspect, there is provided a computer network comprising: a user terminal responsive to user input indicative of user acceptance of terms and conditions for obtaining a copy of an electronic file including a term restricting the provision of copies of the electronic file to third parties to generate a request for an electronic file; a seal server responsive to a request to provide an electronic seal to: determine a current time; determine an encrypted hash value on the basis of data included in the received request, the current time and data identifying the seal server; return the encrypted hash value as an electronic seal to the requester of the electronic seal; and a remote server responsive to receipt of a request for an electronic file from the user terminal to obtain a copy of the electronic file; process the obtained copy of the requested electronic file to generate a watermarked copy of the electronic file; generate a request for an electronic seal to be generated on the basis of data indicative of: the generated watermarked copy of the requested electronic file, the requester of the copy of the electronic file and the time of the generation of the electronic seal; and responsive to receipt of a requested electronic seal to store a copy of the requested electronic seal and to dispatch the watermarked copy of the electronic file to the requester.

The remote server may be responsive to receipt of a requested electronic seal to dispatch a watermarked copy of an electronic file to a requester together with a copy of the electronic seal.

The computer network may further comprise: a time server including a clock, wherein the time server is connected to the seal server via a secure communications link and the seal server is responsive to request to provide an electronic seal to determine a current time by sending a request via the secure link to the time server and the time server is responsive to a request received via the secure link to provide the seal server with time data indicative of the current time indicated by the clock.

The computer network may also comprise a media file database configured to store media files, wherein the remote server responsive to receipt of a request for an electronic file from the user terminal to obtain a copy of a media file stored in the media file database.

In another aspect, there is provided a server operable to provide electronic files to a user terminal in response to a request from the user terminal identifying an electronic file and an end user's acceptance of terms and conditions including a term restricting the provision of copies of the electronic file to third parties to generate a request for an electronic file, the server comprising: a water-marking module operable responsive to receipt of a request for an electronic file from the user terminal to obtain a copy of the electronic file and process the obtained copy of the requested electronic file to generate a watermarked copy of the electronic file; wherein the server is configured to generate a request for an electronic seal generated on the basis of data indicative of the generated watermarked copy of the requested electronic file, the requester of the copy of the electronic file and the time of the generation of the electronic seal; and responsive to receipt of a requested electronic seal to dispatch the watermarked copy of the electronic file to the requester.

The server may also comprise a hash calculator operable to determine a hash value for a generated watermarked copy of an electronic file; wherein the server is configured to generate a request to provide an electronic seal based on a hash value determined for a generated watermarked copy of an electronic file as data indicative of the generated watermarked copy of the requested electronic file.

The server may also comprise a download database operable to store copies of requested electronic seals receive in response to requests generated by the server.

In some embodiments, the server may be responsive to provision of a suspect copy of an electronic file to: cause the hash calculator operable to determine a hash value for the suspect electronic file; and determine if the download database includes a copy of an electronic seal associated with the hash value determined for a suspect electronic file; and if so provide data identifying the requester of the copy of the electronic file and the time of the generation of the electronic seal.

In another aspect, there is provided a non-transitory computer interpretable medium storing computer interpretable instructions which when interpreted by a programmable computer cause the computer to respond to receipt of a request for an electronic file from a user terminal by: obtaining a copy of the requested electronic file; process the obtained copy of the requested electronic file to generate a watermarked copy of the electronic file; generate a request to provide an electronic seal on the basis of data indicative of the generated watermarked copy of the requested electronic file, the requester of the copy of the electronic file and the time of the generation of the electronic seal; and respond to receipt of a requested electronic seal by storing the received electronic seal and dispatching the watermarked copy of the electronic file to the user terminal.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. An embodiment of the present invention will now be described in greater detail with reference to the accompanying drawings in which.

DESCRIPTION OF THE EMBODIMENTS

Figure 1:
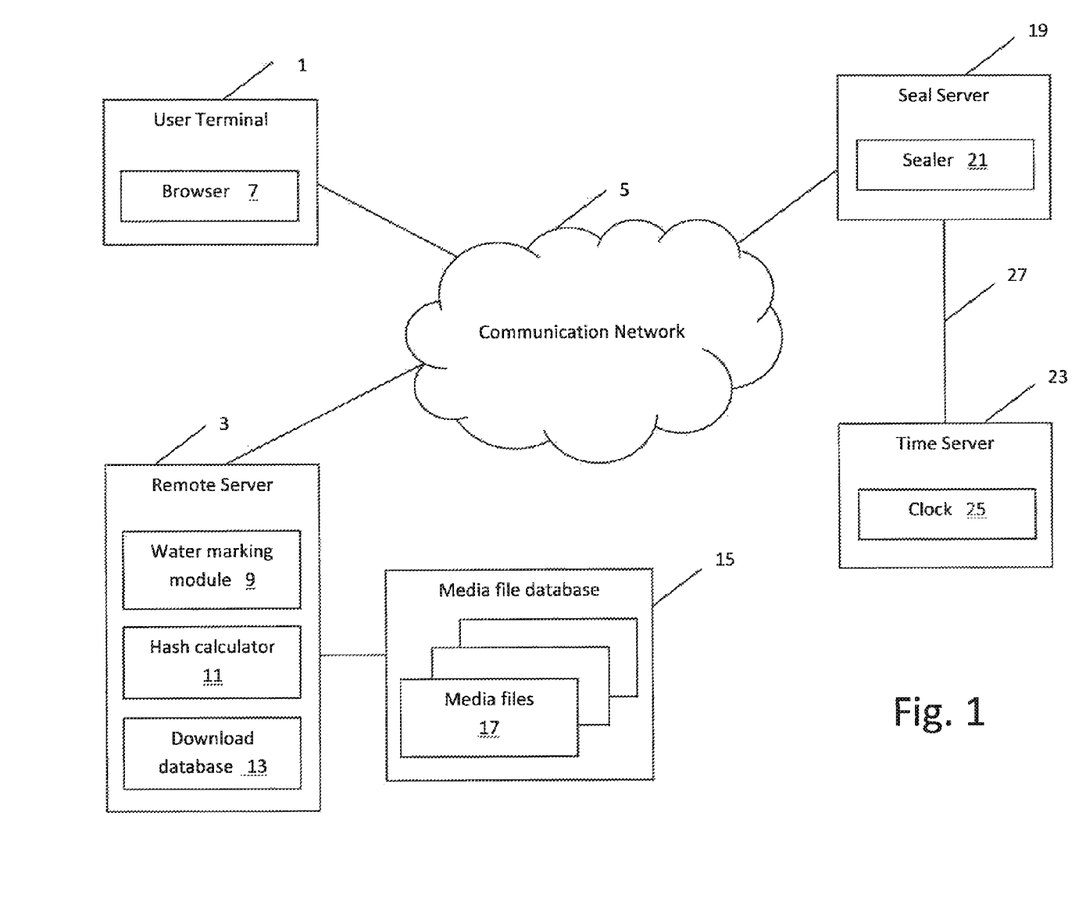
FIG. 1 is a schematic block diagram of a computer network embodying the present invention.

A computer network is provided comprising a user terminal 1 and a remote server 3 connected via a communications network 5, which in this embodiment comprises the Internet. A browser program 7 is provided in the memory of the user terminal 1. The browser program 7 enables a user to cause the user terminal 1 access the remote server 3 via the communications network 5.

Stored within the memory of the remote server 3 are a water-marking module 9, a hash calculator 11 and a download database 13. The remote server 3 is connected to a media file data base 15 storing media files 17. These media files 17 can be any sort of electronic file which might be suitable for distribution such as music files, video files etc. Some embodiments the media file data base 15 could be configured to store other types of electronic file such as executable computer programs which a user might wish to down load an where the subsequent use of the electronic file is desired to be monitored and controlled.

A seal server 19 storing a sealer program 21 is also connected to the remote server 3 via the communications network 5. This seal server 19 is connected to a time server 23, which contains a clock 25 via a secure communications link 27.

As will be described in detail in the application, the remote server 3 is arranged to respond to a request from a user terminal 1 for the download of a media file 17 to cause a unique copy of the media file to be generated and sent to the user terminal 1. At the same time the remote server 3 is also arranged to access the seal server 19, which causes a sealed record of the transaction to be generated and stored. Subsequently, if a suspect media file 17 is identified the sealed record provides evidence of the original transaction which led to the media file 17 being distributed and hence the original source of the unauthorised. Control of distributed media files can be enforced by imposing penalties in the event that unauthorised copies are identified.

Controlling the distribution of media files 17 in the manner described above minimises the intrusion and disruption associated such monitoring the distribution and use of a media file 17. This is because the only data, which is collected, is data relating to the original transaction, which results in a water-marked copy of the file being issued. No subsequent monitoring is necessarily required. Rather the data within the download database is merely a record of the timing and content of an initial transaction resulting in the issuance of a copy of a media file 17 with a unique digital watermark.

No data is stored on a long term basis by the seal sever 19. Rather the function of the seal sever 19 is to act as a trusted third party whose only activity is to provide and confirm the validity of sealed documents containing details of the contents and agreement of downloads made by users. This provides an end user with reassurance that sealed documents issued by the remote server 3 uniquely identify an individual transaction and hence prevent an organisation running the remote server 3 and the media file database from concocting evidence of transactions which did not occur.

If a sealed record of a transaction is generated in the manner described, the sealed record acts as evidence of a transaction, which results in the issuance of a particular water-marked copy of a media file 17. Following issuance an end user can be free to use or utilise the created media file 15 and create copies of the file 17. However, unauthorised copying of a file 17 can be reduced by providing penalties within a contract, which an end user agrees to prior to the media file being issued. More specifically, the contract can provide that the end user is liable for losses arising should copies of the water-marked media file 17 be provided or made available to third parties. In the event that copies of the water-marked media file 17 provided to an end user are identified, the sealed digital record evidencing the agreement can then be used to act against the end user. As the end user will be made aware of the consequences of breaching the contract, which caused a water-marked media file 17 to be made available, the end user should then take responsibility to prevent such unauthorised copying and hence the described system should reduce the amount of unauthorised copying.

The processes involved in obtaining a copy of a media file 17 and generating an electronically sealed record of the transaction which result in a copy of the media file 17 being delivered to an end user will now be described in detail with reference to the flow diagram of FIG. 2.

Figure 2:
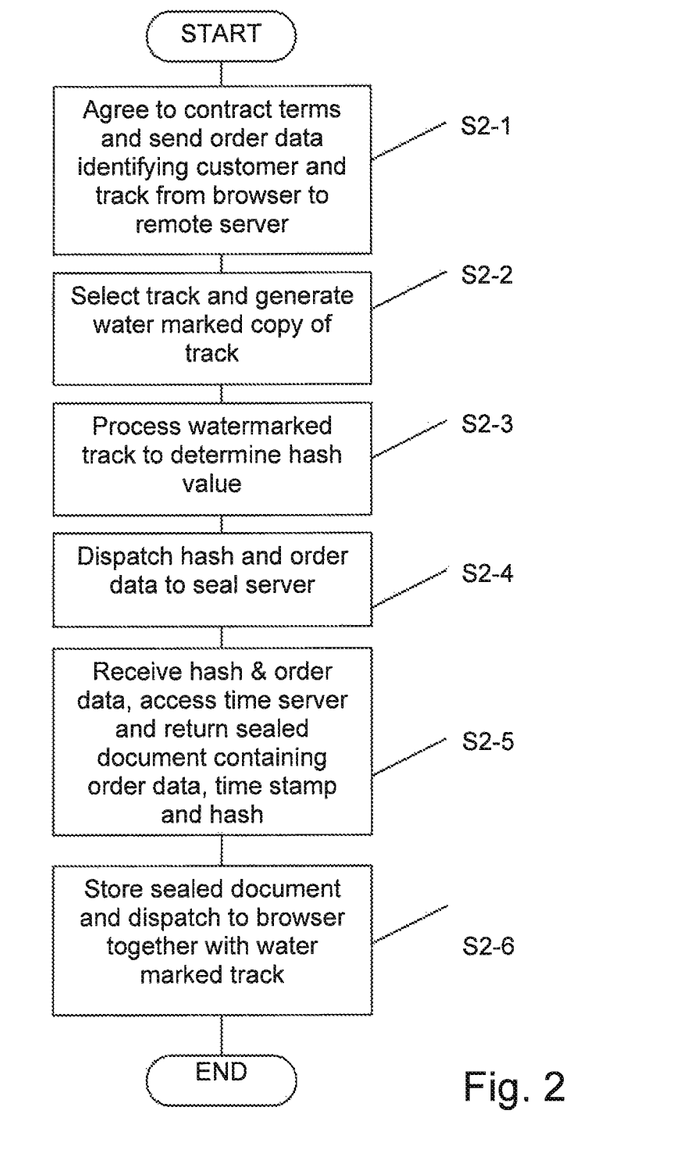
FIG. 2 is a flow diagram illustrating the steps involved in generating and registering a copy of a media file.

Turning to FIG. 2, initially (s2-1) an end user is presented with terms of a contract under which a media file 17 is to be provided to the end user. This will typically involve an end user identifying a desired media file 17 and indicating their agreement to the terms of the contract by accessing a website using the browser 7 and entering the order data into a form displayed on the user terminal 1 by the browser 7. When order data has been entered using the browser 7, the user then confirms their agreement to the terms and conditions and causes the browser 7 to dispatch the order data from the user terminal 1 to the remote server 3 via the communications system 5.

Typically order data will comprise data identifying the user of the user terminal 1 and the media file 17 which the user wishes to obtain. The form displayed on a user terminal 1 to a user will also require a user to indicate their agreement to a set of terms and conditions. This could be required in the form of a tick box on the form, which is required to be checked prior to order data being sent by the user terminal 1 to the remote server 3. Completing the check box will indicate a user's agreement to a set of terms and conditions which will include the user agreeing not to provide copies of the requested media file 17 to third parties and as well as agreeing to be liable for any losses which arise if such a term is breached.

In the case of a user accessing a media file data base 15 storing a number of music tracks, each associated with a unique identification number, the following order data might be entered into a form displayed on the user terminal 1 and dispatched to the remote server 3. The table below illustrates an exemplary record.

| | |
|---|---|
| Name: | John Smith |
| Address: | 12 Acacia Avenue, Anytown, Anywhere |
| Track identification number: | #12234567889 |
| Credit card number | 1111 2222 3333 4444 |
| Expiry date | October 2013 |
| Security code | 123 |

When (s2-2) the order data is received at the remote server 3, the remote server then utilises the track identification number to retrieve a media file 17 from the media file database 15. The remote server 3 then proceeds to invoke the water-marking module 9, which processes the retrieved media file 17 to generate a unique water-marked copy of the media file 17.

More specifically the water-marking module 9 comprises a conventional water-marking module 9, which proceeds to determine a unique number to associate with the water-marked copy, which is to be generated. This could be achieved by the water-marking module 9 either assigning unique numbers to each copy in a predefined order or alternatively choosing a random number to be assigned to the file. The water-marking module 9 then proceeds to generate a modified copy of the media file 17 where portions of the file are modified relative to the original on the basis of the unique number assigned to that copy of the file. Typically this modification process will involve changing a number of bit values in the media file where the bit values are associated with different parts of the media file 17. The modification will be such that it does not degrade the appearance of the copy compared with the original and to be essentially undetectable other than from a direct comparison between the original and the copy.

Thus for example where a media file is a music track a number of individual bit values encoding the sound of a song may be modified to very slightly modify the volume or pitch of a number of sections of the song. These modifications are determined so as to be so small that the changes would not be apparent to a listener when the modified track is played, as they would not be detectable as a variation by human hearing. Similarly in the case of a video file, a limited number of individual pixels in selected images might be modified to be represented by slightly altered colours, the modification being such as not to be apparent by the human eye but resulting in the computer encoded image being slightly modified.

Having processed a retrieved media file 17 using the water-marking module 9, the remote server 3 will then have a unique copy of the media file 17 requested available for dispatch to the user. The remote server 3 then (s2-3) proceeds to invoke the hash calculator 11, which determines a hash value for the unique water-marked copy of the media file 17.

The hash calculator 11 determines a hash value for the water-marked copy of the media file 17 in a conventional way based on a deterministic hashing algorithm. This generates a hash value for the water-marked copy of the media file 17 by generating a digest of the water-marked file. The hashing function is selected so that hash values are dependent upon the entire content of the water-marked copy of the media file 17 where small differences in the original data result in significant differences in the determined hash value. Thus in this way the hash calculator 11 ensures that each individual water-marked copy of a media file 17 is associated with a different hash value. Additionally by processing the media file 17 in this way a hash value is obtained which is representative of the generated file but which is much smaller in size. Thus the generated hash value acts a fingerprint to uniquely identify the file.

The remote server then (s2-4) proceeds to send the hash value and metadata for the order via the communications network 5 to the seal server 19.

Typically the data sent to the seal server 19 will comprise text identifying the details of the original order as well as data uniquely identifying the remote server 3 as the source of the request.

Thus, for example, in the case of the order data referred to above, the following data might be dispatched to the seal server 19:

| | |
|---|---|
| Requester ID | Name of Company controlling remote server |
| Remote Server Name | Remote Server Name |
| Remote Server ID | ABCDE 123456 |
| Order Number | 9876543 |
| Time and Date of dispatch | 12:34 11 January 2011 |
| Customer Name: | John Smith |
| Customer Address: | 12 Acacia Avenue, Anytown, Anywhere |
| Track identification number: | #12234567889 |
| Song Title | Song Name |
| Artist | Name of Artist |
| Hash code for file to be dispatched | # cb7jkd-f76k8-s55yd-90yhh-g1g2g |

It will be appreciated that as the hash code is dependent upon the entirety of the water-marked copy of the media file 17 and different hash codes will be created for copies of files bearing different water-marks, the hash code will uniquely identify the water-marked file, which is to be dispatched to a user. It will also be appreciated that sending just a hash code for a file together with order meta data rather than sending the order meta data together with a copy of the water-marked media file reduces the amount of data which needs to be dispatched.

When (s2-5) the order data is received by the seal server 19, the seal server proceeds to invoke the sealer program 21 to process the received data. This causes the sealer program 21 to access the time server 23 via the secure communications link 27.

In this embodiment the sealer program 21 is arranged to access the timer server 23, by passing a request to identify the current time, which includes an identifier identifying the seal sever 19 to the time server 23. In this way time data from the time server 23 can be restricted so that only authorised parties can obtain data from the time server 23.

When a request is received by the time server 23, the time server 23 initially checks that the identifier associated with the request is associated with an authorised user. That being the case the time server 23 then returns data to the seal server 19 indicating the current time as indicated by the clock 25.

When the time data is returned by the time server 23, the seal server 19 will be in possession of the time data, and the hash code and the order metadata received from the remote server 3. The seal server 19 then proceeds to generate an electronic seal on the basis of this data. More specifically, the sealer program 21 processes the received data using a cryptographic key available only to the seal server program 21 to generate an encrypted hash value, which is then appended to the data.

Thus for example in the case of the data describe above, initially the received data might be processed by appending data identifying the sealing authority with ownership and control of the seal server 19 and time data received from the time server 23 to the data received from the remote server 3. This would then create the following data:

| | |
|---|---|
| Requester ID | Name of Company controlling remote server |
| Remote Server Name | Remote Server Name |
| Remote Server ID | ABCDE 123456 |
| Order Number | 9876543 |
| Time and Date of dispatch | 12:34 11 January 2011 |
| Customer Name: | John Smith |
| Customer Address: | 12 Acacia Avenue, Anytown, Anywhere |
| Track identification number: | #12234567889 |
| Song Title | Song Name |
| Artist | Name of Artist |
| Hash code for file to be dispatched | # cb7jkd-f76k8-s55yd-90yhh-g1g2g |
| Sealing Authority | Name of company controlling seal server |
| Time stamp | 12:37 11 January 2011 |

The sealer program 21 then proceeds to generate a cryptographic seal by determining a hash value for this data and then processing the generated hash using a private cryptographic key. This encrypted hash value is then returned together with the other data to the remote server 3.

Thus, in the case above the following data might be returned:

| | |
|---|---|
| Requester ID | Name of Company controlling remote server |
| Remote Server Name | Remote Server Name |
| Remote Server ID | ABCDE 123456 |
| Order Number | 9876543 |
| Time and Date of dispatch | 12:34 11 Jan. 2011 |
| Customer Name: | John Smith |
| Customer Address: | 12 Acacia Avenue, Anytown, Anywhere |
| Track identification number: | #12234567889 |
| Song Title | Song Name |
| Artist | Name of Artist |
| Hash code for file to be dispatched | # cb7jkd-f76k8-s55yd-90yhh-g1g2g |
| Sealing Authority | Name of company controlling seal server |
| Time stamp | 12:37 11 Jan. 2011 |
| Encrypted Sealing data | # loij9-freds-knt42-llkju-098jl-lloki |

The remote server 3 then (s2-6) proceeds to store a copy of this electronic seal within the download database 13 and dispatches a copy to the user terminal 1 together with the water-marked copy of the media file 17 previously generated by the water-marking module 9. The media file 17 and the copy of the sealed document may be accompanied by a further copy of the terms of the contract stating that the water-marked media file 17 being issued is not be provided to unauthorised third parties and that the end user is to be liable for any loses arising from breach of the contract. Having dispatched the water-marked media file 17 the remote server 3 then deletes any data corresponding to the water-marked media file 17 except for the copy of the electronic seal recording the transaction stored in the download database 13.

The generation of a sealed document including an electronic seal in this way provides evidence of a request for an identified media track and the parties involved and hence the agreement of the end user to the terms and conditions on which the media file 17 is to be provided to them. The separation of the seal server 19 from the remote server 3 means that the sealing service can be entrusted to an independent third party. In this way the operator of the remote server 3 is unable to create sealed documents without the consent of the sealing authority operating the sealing server 19. Further as the electronic seal is dependent upon obtaining time data from the time server 23, the sealed document also records the time when an agreement is made. The separation of the operation of the remote server 3 and the seal server 19 also prevents the remote server 3 from modifying records at a later date as if any modifications are made the sealing data included in the electronic seal will no longer match the rest of the content of the sealed document.

It will also be noted that the operation of the seal server 19 is limited to the processing and generation of documents and no data is required to be stored by the seal server 19. As such the seal server 19 will not store any personal data about the transaction, which reduces the possibility of breaches of security and privacy occurring.

Having processed a media file 17 in the way described, both the remote server 3 and the end user are put in possession of a sealed electronic document recording their transaction. Through the generation of a water-marked media file 17 and an associated hash value the electronic seal is directly linked to a water-marked media file 17 in the possession of the end user. As the water-marked media file 17 is deleted from the remote server 3 after dispatch to the end user the operator of the remote server 3 is not in a position to create the water-marked media file 17 after it has been dispatched.

Further, the involvement of an independent sealing authority then proceeds to ensure that the electronic seal can only be generated at a particular time and cannot be manipulated or created at a later date without rendering the sealing data incompatible with the rest of the document.

Figure 3:
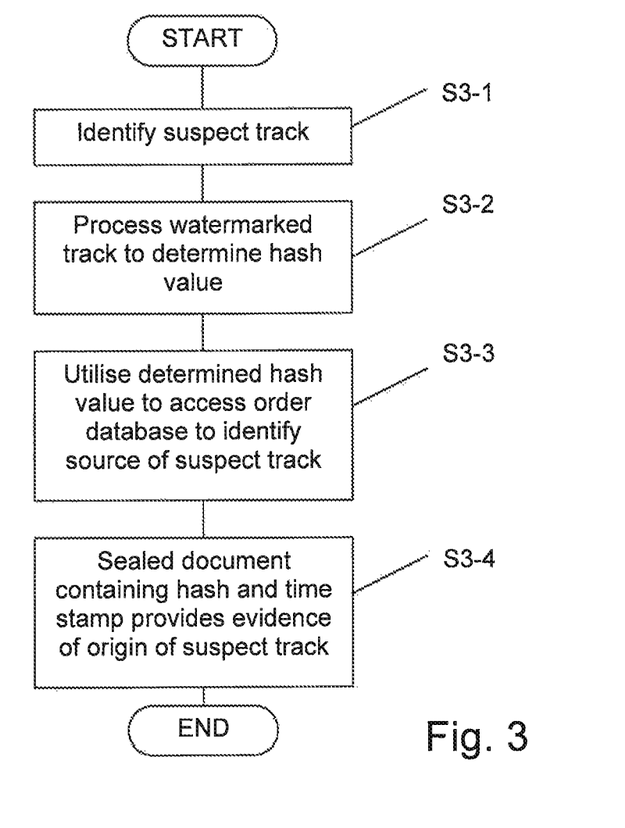
FIG. 3 is a flow diagram illustrating the steps involved in determining the origin of a suspect media file.

The steps involved in determining the origin of a suspect media file will now be described with reference to the flow diagram shown in FIG. 3. Turning to FIG. 3, initially a suspect track is identified (s3-1). This could be because a distributor identifies an unauthorised download website providing copies of their content or some other means.

Having obtained a copy of a suspect media file, the media file is then processed (s3-2) using the hash calculator 11 of the remote server 3 to determine a hash value for the suspect track. As explained above the generated hash value will be dependent upon the entire content of the media file 17 and hence different hash values will be determined when different water-marked copies of a media file are processed.

The content of the download database 13 is then (s3-3) searched to determine whether the hash value determined for the suspect media file matches the hash values included in any of the electronic seals in the database 13.

If a match is determined then this will indicate (s3-4) that the suspect media file is identical to the water-marked media file 17, which was provided to an end user as a result of the transaction memorialized in the electronic seal. If the transaction which was the subject of the initial distribution of the media file contains a clause forbidding unauthorised distribution the end user can then utilise the electronic document including the electronic seal as evidence of the original agreement and seek damages from the end user which arise from the distribution of unauthorised copies.

The above-described embodiment thereby provides means for a content provider to identify the source of unauthorised copies and seek redress for damages, which may result.

Although in the described embodiment the water-marking and hashing algorithms are described as processing the entirety of a media file 17 it will be appreciated that the modification and hash may be limited just to certain portions of a media file 17. In embodiments where only selected parts of a file were subject to modification and hashing the above-described system would also be able to identify unauthorised copying where attempts were made to disguise the origin of an unauthorised file. More specifically in the above-described embodiment where a hash value is dependent upon the entirety of a media file 17, an unauthorised user could attempt to hide the origin of a file by making minor modifications to the unauthorised file such as adding additional water-marking information. However if only part of a file were to be water-marked a hashed unauthorised users would not necessarily know which bits of a file would need to be amended to alter a generated hash value and thereby disguise the origin of the file.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier could be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When a program is embodied in a signal, which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A method of recording evidence to establish the origin of an electronic file, comprising:
   receiving a request to provide a copy of an electronic file from a requester;
   generating a water-marked copy of the requested electronic file by
      obtaining an electronic file;
      determining a code to be embedded in the electronic file; and
      modifying portions of the electronic file to embed value corresponding to the determined code, wherein the modification of portions of the electronic file are not such so as to effect the functionality of the modified file compared with the obtained electronic file;
   creating an electronic seal on the basis of data indicative of the generated watermarked copy of the requested electronic file, the requester of the copy of the electronic file and the time of the generation of the electronic seal;
   storing a copy of the electronic seal; and
   providing the generated water-marked copy of the requested electronic data to the requester.

2. The method of claim 1 wherein the electronic file comprises data recording sound and the modification of portions of the electronic file comprise modifying sound data included in the file in a manner which is not detectable when listening to the sound.

3. The method of claim 1 wherein the electronic file comprises image data and the modification of portions of the electronic file comprise modifying image data included in the file in a manner which is not detectable when viewing the image recorded by the image data.

4. The method of claim 1 wherein the data indicative of the generated watermarked copy of the requested electronic file comprises a copy of the generated watermarked copy of the requested electronic file.

5. The method of claim 1 further comprising processing the generated watermarked copy of the requested electronic file to determine a hash value of the generated watermarked copy of the requested electronic file and using the determined hash value as data indicative of the generated watermarked copy of the requested electronic file when creating an electronic seal.

6. The method of claim 1 wherein creating an electronic seal on the basis of data indicative of the generated watermarked copy of the requested electronic file, the requester of the copy of the electronic file and the time of the generation of the electronic seal comprises:
   obtaining time data indicative of a current time;
   determining a hash value for an electronic document including data indicative of the generated watermarked copy of the requested electronic file, the requester of the copy of the electronic file and the current time;
   encrypting the determined hash value for the electronic document; and
   using the encrypted hash value as the electronic seal.

7. The method of claim 6 wherein the electronic seal includes human interpretable data selected from the group comprising the name and address of the requester of the electronic file; the name of the electronic file; data identifying the provider of the electronic file and data identifying the provider of the electronic seal.

8. A method of providing an electronic file to a requester and recording data as evidence of the request, comprising:
   providing a requester with terms and conditions for obtaining a copy of an electronic file, wherein the terms and conditions include a term restricting the provision of copies of the electronic file to third parties;
   responding to input from the requester confirming acceptance of the terms and conditions provided to the requester by generating a request to receive a copy of an electronic file and dispatching the request;
   receiving a request to provide a copy of an electronic file from a requester;
   generating a water-marked copy of the requested electronic file;
   creating an electronic seal on the basis of data indicative of the generated watermarked copy of the requested electronic file, the requester of the copy of the electronic file and the time of the generation of the electronic seal;
   storing a copy of the electronic seal; and
   providing the generated water-marked copy of the requested electronic data to the requester.

9. The method of claim 8 wherein generated request comprises data identifying the requester and data identifying the requested electronic file.

10. The method of claim 8 further comprising;
    identifying a copy of a suspect electronic file;
    comparing data indicative of the suspect electronic file with data indicative of a generated watermarked copy of a requested electronic file for which an electronic seal has been generated;
    in the event that the comparison indicates that the suspect electronic file corresponds to a generated watermarked copy of a requested electronic file, determining the identity of the requester of the generated watermarked copy of a requested electronic file corresponding to the suspect electronic file; and
    enforcing the term restricting the provision of copies of the electronic file to third parties against the requester.

11. A non-transitory computer interpretable medium storing computer interpretable instructions which when interpreted by a programmable computer cause the computer to respond to receipt of a request for an electronic file from a user terminal by:
    obtaining a copy of the requested electronic file;
    process the obtained copy of the requested electronic file to generate a watermarked copy of the electronic file by;
       determining a code to be embedded in the electronic file; and
       modifying portions of the electronic file to embed value corresponding to the determined code, wherein the modification of portions of the electronic file are not such so as to effect the functionality of the modified file compared with the obtained electronic file;
    generate a request to provide an electronic seal on the basis of data indicative of the generated watermarked copy of the requested electronic file, the requester of the copy of the electronic file and the time of the generation of the electronic seal; and respond to receipt of a requested electronic seal by storing the received electronic seal and dispatching the watermarked copy of the electronic file to the user terminal.

* * * * *